May 12, 1925.
J. A. JOHNSON
SEALING HEAD
Filed May 8, 1922
1,537,468
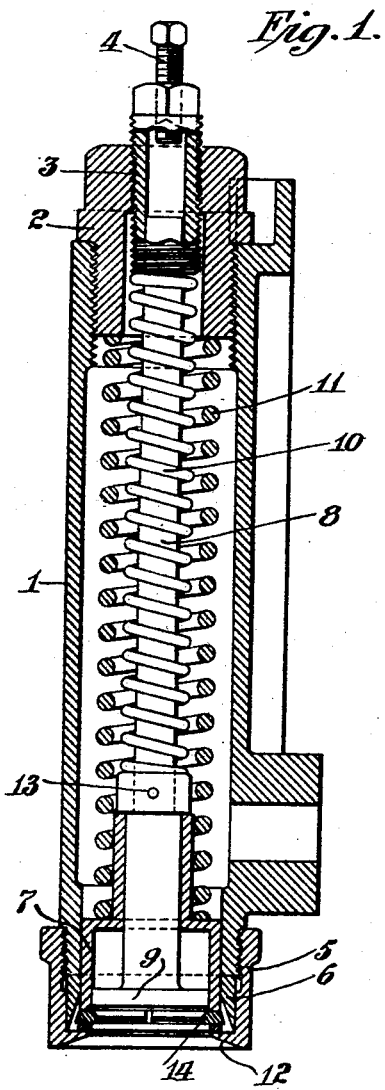
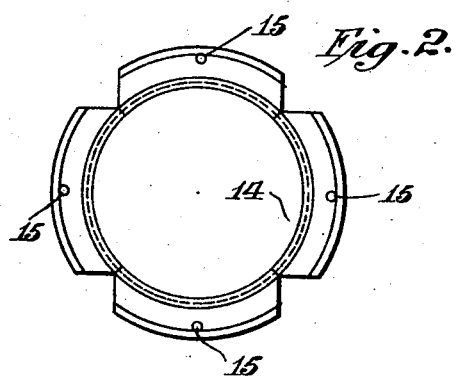
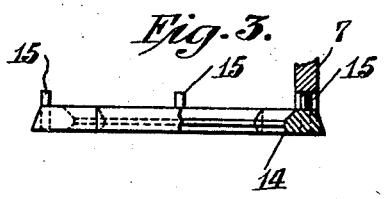
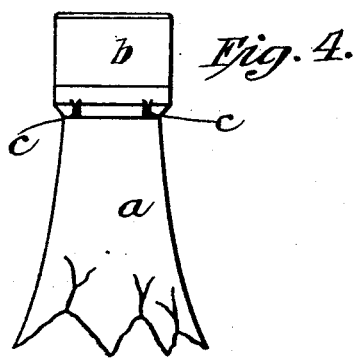
John A. Johnson
INVENTOR
BY Robert B Kilgour
ATTORNEY Patented May 12, 1925.

1,537,468

UNITED STATES PATENT OFFICE.

JOHN A. JOHNSON, OF WOODHAVEN, NEW YORK.

SEALING HEAD.

Application filed May 8, 1922. Serial No. 559,218.

*To all whom it may concern:*

Be it known that I, JOHN A. JOHNSON, a citizen of the United States, residing at Woodhaven, in the county of Queens and State of New York, have invented certain new and useful Improvements in Sealing Heads, of which the following is a specification.

My invention relates to sealing heads for bottle capping machines which affix a closure to a receptacle and it is my object to produce a simple and strong sealing head which will apply a top sealing pressure to the closure and thereafter bend or clinch the skirt of the closure under the bead of the container and which is so constructed that it can be quickly and easily adjusted and which will not jam or catch and which will eject the sealed container.

In the drawing Fig. 1 is a longitudinal view, partly in section of my improved sealing head; Fig. 2 a face view of the segmental clinching rings; Fig. 3 a cross-sectional view of the ring and Fig. 4 a view of a closure on a container.

The sealing head consists of an outer, tubular casing 1 threaded internally at its upper end to receive a tubular screw plug 2. This plug 2 is internally threaded and a second tubular screw plug 3 is screwed therein. The second plug 3 is also internally threaded and an adjusting screw 4 is screwed therein. The lower end of the tubular casing has a lipped cap 5 screwed thereon. A hardened steel ring 6 with a tapered inner face is inserted in the cap 5 and held in place between the lip and the bottom of the casing. A differential diameter sleeve 7 is slidable in the casing 1 inside the taper ring 6 with its small diameter extending upward into the casing proper.

A plunger 8 with a head 9 at its lower end passes through the slidable sleeve 7 and extends into the plug 3 which acts as a guide for its upper end. A helical spring 10 extends between the plug 3 and a collar 13 on the lower part of the plunger. A second helical spring 11 extends between the plug 2 and the sleeve 7.

The inwardly extending lip 12 on the cap 5 prevents the sleeve 7 passing out of the lower end of the sealing head and the downward movement of the plunger is limited by the collar 13.

The slidable sleeve 7 carries a segment ring 14 of hardened steel, preferably made in four parts as shown in Figs. 2 and 3 and a pin 15 on each segment is slidable in a groove in the lower part of the sleeve 7 whereby the segments are maintained in proper position but free to move radially with respect to the sleeve 7.

The pressure of the spring 10 on the plunger 8 may be adjusted by turning the screw plug 3 and the pressure of the spring 11 on the sleeve 7 may be adjusted by turning the plug 2. To prevent the sleeve 7 lifting the segment ring so high that the segments will pass entirely over the taper and into the cylindrical portion and there stick and jam and also to prevent the segments travelling radially inwards far enough to crush a container the adjusting screw 4 may be turned until the plunger 8 strikes it when the segment ring has travelled up the taper in the ring 6 a sufficient distance to properly bend and clinch the skirt of the closure under the bead on the container.

The operation of the head is as follows:—
A container *a* with a closure *b* thereon is inserted into the head. On the reciprocation of either the head or container the top sealing pressure is applied to the closure by the plunger 8 acting through the head 9 and spring 10 until the head 9 is forced up into contact with the shoulder inside the sleeve 7. The sleeve 7 and plunger then continue to travel up inside the casing against the combined pressures of springs 10 and 11, causing the segment ring to ride up the taper on the ring 6 which forces the segments radially inwards so that the skirt of the closure under the bead and the excess metal in the lower edge is pinched between the adjoining segment ends as best shown at *c* in Fig. 4. On the return movement the sleeve 7 moves down under the action of the springs leaving the segment ring free to return to the wider part of the taper when a new cap is inserted and the plunger 8 under the continued action of the spring 10 forces the sealed container out of the head.

I claim:—

1. A sealing head for affixing smooth skirted closures to bottles comprising a casing, a fixed ring inwardly tapered within the lower end of the casing, a slidable sleeve within the lower end of the casing, a segment ring radially movable in the sleeve and adapted to contact with the taper on the fixed ring, a plunger within the sleeve, said plunger being adapted to rise within said sleeve a distance approximately equal to the height of a closure before the segment ring moves radially and means for independently exerting downward pressure on the sleeve and plunger respectively whereby the metal at the lower edge of the skirt of the closure is pinched or folded between the ends of the segment ring sections.

2. A sealing head for affixing smooth skirted closures to bottles comprising a casing, a fixed ring inwardly tapered within the lower end of the casing, a slidable sleeve within the lower end of the casing, a segment ring radially movable in the sleeve and adapted to contact with the taper on the fixed ring, a plunger within the sleeve, said plunger being adapted to rise within said sleeve a distance approximately equal to the height of a closure before the segment ring moves radially, adjusting plugs in the upper end of the casing and springs contacting with the plugs and the sleeve and plunger respectively exerting a downward pressure on the latter whereby the metal at the lower edge of the skirt of the closure is pinched or folded between the ends of the segment ring sections.

3. A sealing head for affixing smooth skirted closures to bottles comprising a casing, a fixed ring inwardly tapered within the lower end of the casing, a slidable sleeve within the lower end of the casing, a segment ring radially movable in the sleeve and adapted to contact with the taper on the fixed ring, a plunger within the sleeve, said plunger being adapted to rise within said sleeve a distance approximately equal to the height of a closure before the segment ring moves radially, adjusting plugs in the upper end of the casing, springs contacting with the plugs and the sleeve and plunger respectively exerting a downward pressure on the latter and adjusting means adapted to contact with the plunger to limit the travel thereof whereby the metal at the lower edge of the skirt of the closure is pinched or folded between the ends of the segment ring sections.

In testimony whereof I have affixed my signature.

JOHN A. JOHNSON.